(12) United States Patent
Recco et al.

(10) Patent No.: US 7,088,530 B1
(45) Date of Patent: Aug. 8, 2006

(54) PASSIVELY ALIGNED OPTICAL ELEMENTS

(75) Inventors: Joseph M. Recco, Spencerport, NY (US); James A. Schmieder, Wayland, NY (US); Paul D. Ludington, Brockport, NY (US); Scott C. Cahall, Fairport, NY (US); Carl F. Leidig, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/046,252

(22) Filed: Jan. 28, 2005

(51) Int. Cl.
*G02B 7/02* (2006.01)
(52) U.S. Cl. .................. 359/811; 359/793; 359/784
(58) Field of Classification Search ............... 359/811, 359/793, 733, 717, 671, 813, 819, 821, 797, 359/784, 771
See application file for complete search history.

(56) References Cited

U.S. PATENT DOCUMENTS

| | | |
|---|---|---|
| 3,873,188 A | 3/1975 | Baeker |
| 4,488,776 A | 12/1984 | Skinner |
| 4,662,717 A | 5/1987 | Yamada et al. ............. 359/362 |
| 4,957,341 A | 9/1990 | Hasegawa |
| 5,526,068 A | 6/1996 | Markovitz |
| 5,548,450 A | 8/1996 | Kang et al. |
| 6,072,634 A | 6/2000 | Broome et al. |
| 6,338,819 B1 | 1/2002 | Braga et al. .................. 422/16 |
| 2003/0184885 A1 | 10/2003 | Tansho et al. ............. 359/819 |
| 2003/0193605 A1 | 10/2003 | Yamaguchi ................. 348/335 |

FOREIGN PATENT DOCUMENTS

| | | |
|---|---|---|
| JP | 02 201302 | 8/1990 |
| JP | 2004-246258 | 9/2001 |
| JP | 2002-286987 | 10/2002 |
| JP | 2004 198903 | 12/2003 |
| JP | 2004 302157 | 12/2003 |

*Primary Examiner*—Timothy Thompson
(74) *Attorney, Agent, or Firm*—William R. Zimmerli

(57) ABSTRACT

An optical system has a first lens element (L1) having an outer portion (36) and a first tapered surface (34). A second lens element (L2) has an outer portion (26) and a second tapered surface (24). The first lens element (L1) and the second lens element (L2) are spaced apart relative to each other and centered relative to the optical axis (O) by a portion of the first tapered surface (34) being in contact with a portion of the second tapered surface (24), the outer portion (36) of the first lens element (L1) being spaced apart from the outer portion (26) of the second lens element (L2).

33 Claims, 9 Drawing Sheets

PASSIVELY ALIGNED OPTICAL ELEMENTS

FIELD OF THE INVENTION

The invention relates generally to optical component mounting and more particularly relates to an optical apparatus and method using tapered surfaces to effect alignment of lens elements.

BACKGROUND OF THE INVENTION

The growth of portable, personal electronics devices such as cell phones, PDAs, and similar devices, has spurred development of miniaturized cameras and light-sensing components that can be incorporated into these devices. The continuing demand for smaller and more powerful imaging apparatus, coupled with the requirement for low cost, presents a considerable challenge to optical and mechanical design. Low-cost lens assemblies, typically including a number of plastic lens elements, are being used increasingly for these applications.

Although very small plastic lenses can be fabricated inexpensively at high volumes, the handling, alignment, and mounting of these tiny optical components into a lens assembly using multiple components poses significant problems. For mobile imaging applications, for example, two lens elements should be laterally aligned (that is, aligned in the plane normal to the optical axis, where z is the optical axis) to within better than +/−20 microns. There are also tight tolerances with respect to the air space, or longitudinal separation along the optical axis (z axis) between lens elements. Tilt in the two orthogonal directions $\theta_x$ and $\theta_y$ should be controlled to within tens of arc-minutes. Clearly, there is considerable challenge in achieving alignment tolerances in these ranges at low cost when assembling miniature optical components using mass-produced plastic lens elements. Conventional active alignment techniques, such as using point-source microscopy to align centers of curvature individually, prove too complex and costly for high-volume production.

A number of other conventional approaches have been applied to the problem of lens mounting, alignment and centration of lenses, including the use of features formed within a lens barrel or other supporting structure, as described, for example, in U.S. Pat. No. 6,338,819 entitled "High Numerical Aperture Objective Lens Assembly" to Leidig and U.S. Pat. No. 4,488,776 entitled "Plastic Lens Cell" to Skinner. Still other approaches use separate spacing elements to provide proper alignment and air space between optical components. For example, referring to FIG. 1, there is shown a lens mount assembly 10 for mounting multiple lens elements L1, L2, L3 along an optical axis O of a barrel 16. Spacers 12 and surface sags provide proper air space between lens elements L1, L2, and L3 along that optical axis. A retaining ring 13 is then used to hold lens elements L1, L2, and L3 and spacers 12 in place following assembly. Spacers 12, in conjunction with lens flanges, also provide tilt alignment $\theta_x$ and $\theta_y$. Lateral alignment of lens elements L1, L2, and L3 is accomplished by care in fabrication, controlling tolerance runout of the lenses, the outside diameter of the lenses, and the inside diameter of barrel 16 or other optical mounting structure. However, such approaches increase the overall parts count and assembly complexity and introduce tolerance build-up that can make proper lens alignment difficult, particularly as lens assemblies grow smaller.

Another approach that has been adopted for miniaturized optical systems uses passive component alignment of lens elements to each other, rather than to a barrel or to some other enclosure. Representative examples of optical apparatus using this technique for centration and spacing include:

U.S. Patent Application Publication No. 2003/0184885 entitled "Producing Method of Image Pickup Device" by Tansho et al. discloses an optical unit in which lens elements are stacked against each other to provide centration, with additional spacing elements;

U.S. Patent Application Publication No. 2003/0193605 entitled "Image-Capturing Lens, Image-Capturing Device and Image Capturing Unit" by Yamaguchi discloses a lens barrel wherein a flange is provided on each of one or more stacked lenses, seated against each other to provide both centration and spacing;

U.S. Pat. No. 4,957,341 entitled "Integral Type Lens" to Hasegawa discloses a compound projection lens in which separate lens elements are aligned against each other using a circumferential flange and guide arrangement;

U.S. Pat. No. 4,662,717 entitled "Lens and Lens Holding Devices" to Yamada et al. discloses use of a snap fit for alignment and spacing of adjacent lenses in a lens holding device; and, U.S. Pat. No. 6,072,634 entitled "Compact Digital Camera Objective with Interdigitated Element Alignment, Stray Light Suppression, and Anti-Aliasing Features" to Broome et al. discloses passive alignment between lens elements in which a tapered fit provides centration and an abutment fit provides proper spacing.

While each of the above-cited solutions for passive alignment provide some measure of accuracy for centration and spacing, there are inherent problems with each of these approaches that limit their successful application for miniaturized lens assemblies. In particular, each of these proposed solutions exhibits problems due to either or both additive tolerance errors and mechanical overconstraint. The apparatus of both '3605 Yamaguchi and '4885 Tansho et al. disclosures would be particularly prone to lateral centration problems, requiring precision fabrication and assembly of the multiple stacked lens components. For production optical components, in practice, there must necessarily be some finite gap between a lens element and the element that provides its lateral constraint, whether this is provided by a lens barrel or by a structure on an adjacent lens element. Thus, there is some built-in amount of imprecision that is inherent to lateral positioning when using conventional lens mounting techniques as shown in both '3605 Yamaguchi and '4885 Tansho et al. disclosures. The apparatus of both '341 Hasegawa and '717 Yamada et al. patents exhibit overconstraint, limiting the applicability of these approaches to lens assemblies. The apparatus of the '634 Broome et al. patent exhibits both lateral centration and overconstraint problems, with a tapered centration fit of a lens element potentially compromised by an abutment fit for spacing of that same lens element. The '634 Broome et al. solution would thus require highly accurate manufacturing tolerances in order to provide suitable centration alignment and spacing. While the high cost of providing such precision tolerance lens components may be justified for larger, complex optical assemblies, such a design approach would not be compatible with requirements for fabrication of high-volume, low-cost, miniaturized optical assemblies.

SUMMARY OF THE INVENTION

According to one aspect of the present invention, an optical system comprises a first lens element having an outer portion and a first tapered surface; and a second lens element having an outer portion and a second tapered surface, wherein the first lens element and the second lens element are spaced apart relative to each other and centered relative to the optical axis by a portion of the first tapered surface being in contact with a portion of the second tapered surface, the outer portion of the first lens element being spaced apart from the outer portion of the second lens element.

According to another aspect of the present invention, an optical system comprises a first lens element having an outer portion and a first tapered surface; a second lens element having an outer portion and a second tapered surface and a third tapered surface; and a third lens element having a fourth tapered surface, wherein the second tapered surface of the second lens element contacts the first tapered surface of the first lens element, the third tapered surface of the second lens element contacts the fourth tapered surface of the third lens element, and the outer portion of the first lens element is spaced apart from the outer portion of the second lens element.

According to another aspect of the present invention, an optical system comprises a first lens element having a first tapered surface; a second lens element having a second tapered surface; and a third lens element having a third tapered surface, the third lens element being spaced apart from the second lens element, wherein the second tapered surface of the second lens element contacts the first tapered surface of the first lens element, and the third tapered surface of the third lens element contacts the first tapered surface of the first lens element.

According to another aspect of the present invention, a method of manufacturing an optical system comprises providing a first lens element having an outer portion and a first tapered surface; providing a second lens element having an outer portion and a second tapered surface; and positioning the first lens element and the second lens element relative to each other by contacting a portion of the first tapered surface with a portion of the second tapered surface with the outer portion of the first lens element being spaced apart from the outer portion of the second lens element.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

The apparatus and method of the present invention provide a passive alignment of two lens elements by employing a tapered fit between the two lens elements. Unlike earlier solutions that use combinations of tapered and abutment fittings for lens positioning and alignment, the approach of the present invention uses only a tapered surface fitting for both lens centration with respect to the optical axis and lens spacing along the optical axis.

Figure 1:
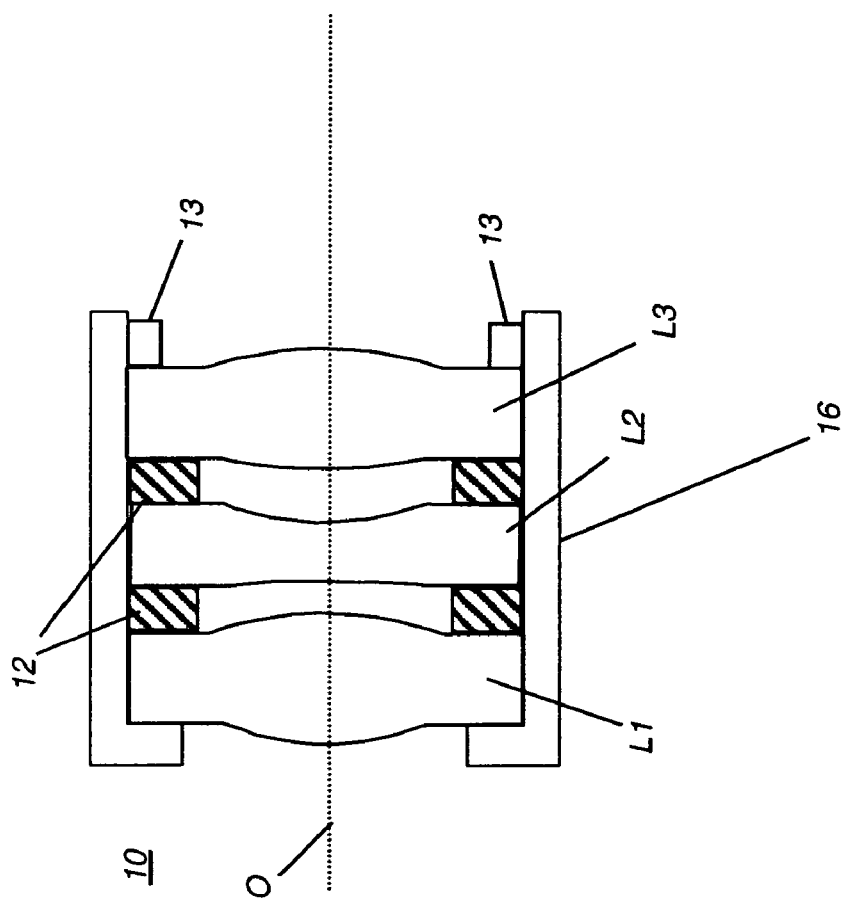
FIG. 1 is a cross-sectional side view of a lens assembly showing one conventional centration alignment and spacing technique.
Figure 2:
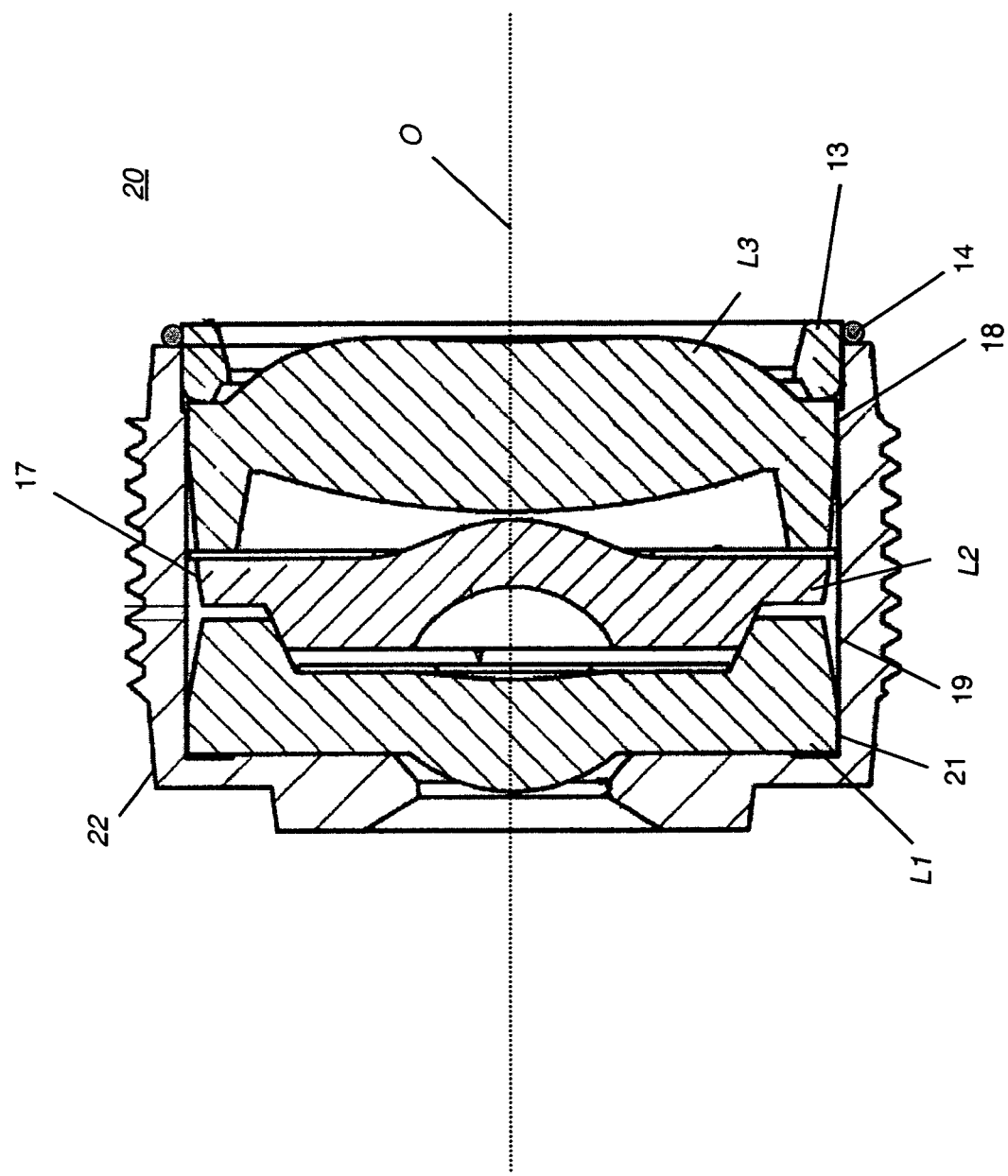
FIG. 2 is a cross-sectional side view showing a lens assembly configured wherein adjacent lenses have a tapered fit, using the method of the present invention.

Referring to FIG. 2, there is shown an optical system 20 according to one embodiment of the present invention. Here, lens elements L1 and L2 are fitted together within a lens barrel 22 or other mounting structure, using the tapered fit passive alignment technique of the present invention. Lateral alignment for lens components within optical system 20 is provided by lens elements L1 and L3. Lateral alignment for lens element L1 is given by the fit between the outer diameter (OD) of lens L1, shown as 21 in FIG. 2, and an inner surface 19 of lens barrel 22. Similarly, lateral alignment for lens element L3 is given by the fit between the outer diameter (OD) of lens L3, shown as 18 in FIG. 2, and inner surface 19 of barrel 22. Significantly, lens element L2, with outer diameter shown as 17 in FIG. 2, does not come into contact with inner surface 19; instead, outer diameter 17 of lens L2 "floats" in space with respect to inner surface 19 and does not affect the lateral alignment of optical assembly 20. Advantageously, lens L2 can have relaxed fabrication tolerances for its outer diameter 17, as long as there is no contact with inner surface 19 of barrel 22.

Figure 3:
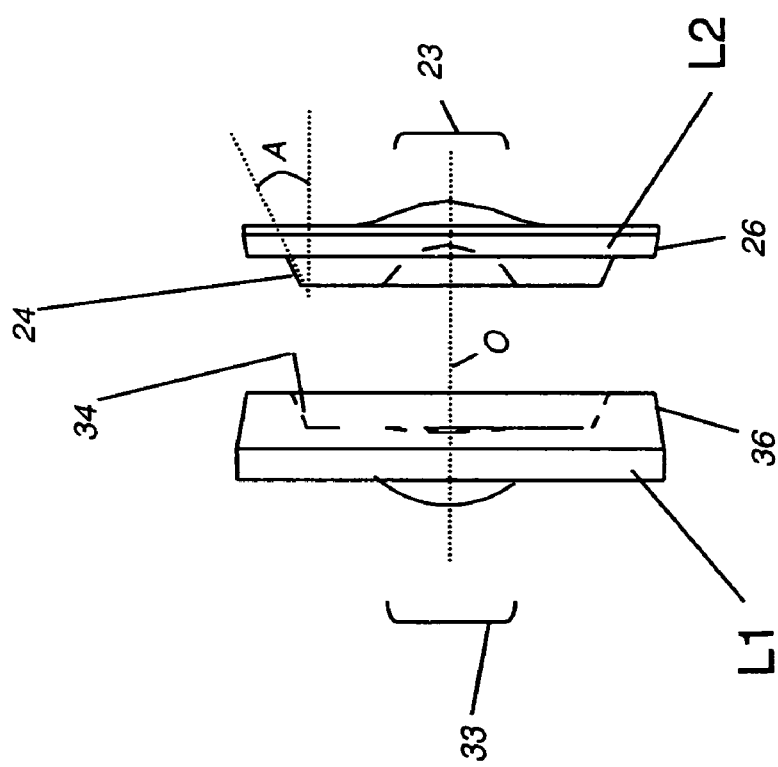
FIG. 3 is a side view showing two lenses adapted for a tapered fit.
Figure 4:
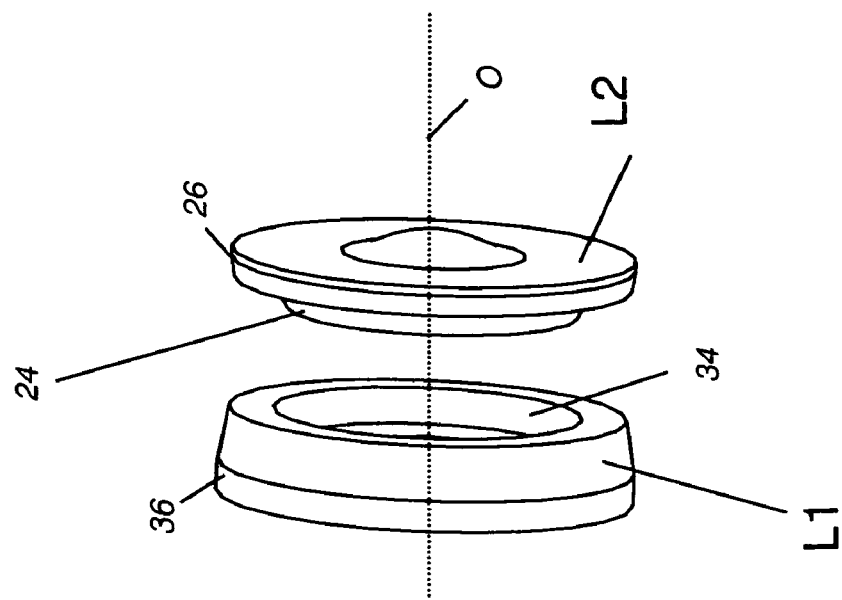
FIG. 4 is a perspective side view showing the lenses of FIG. 3 from a slight angle.
Figure 5:
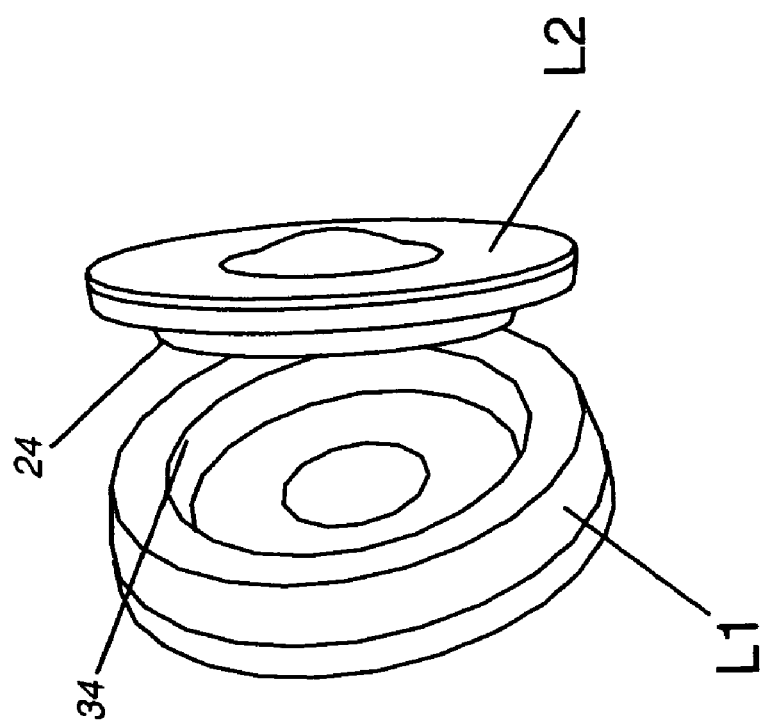
FIG. 5 is a perspective view with the lenses of FIG. 3 at angles that show tapered features.

FIGS. 3, 4, and 5 show, in side and perspective views, how lens elements L1 and L2 are constructed in order to provide a tapered fit. FIG. 3 shows, in exploded view form, how lens elements L1 and L2 align with optical axis O. Lens element L2 has a tapered surface 24, protruding, with a generally convex shape, outward from the main body of the lens and tapered in a direction toward optical axis O at an angle A with respect to axis O. Tapered surface 24 lies between a clear aperture 23 for refracting incident light and an outer portion 26 that lies outside clear aperture 23 and extends radially outward relative to optical axis O. Lens element L1 has a generally concave-shaped tapered surface 34 with a taper that extends in a direction away from optical axis O and that is suitably dimensioned for mating with the corresponding convex-shaped tapered surface 24 of lens element L2. Tapered surface 34 lies between a clear aperture 33 and an outer portion 36 that lies outside clear aperture 33 and extends radially outward relative to optical axis O. The side and angled views of FIGS. 4 and 5 give a clearer illustration of the various lens element L1 and L2 components.

Figure 6:
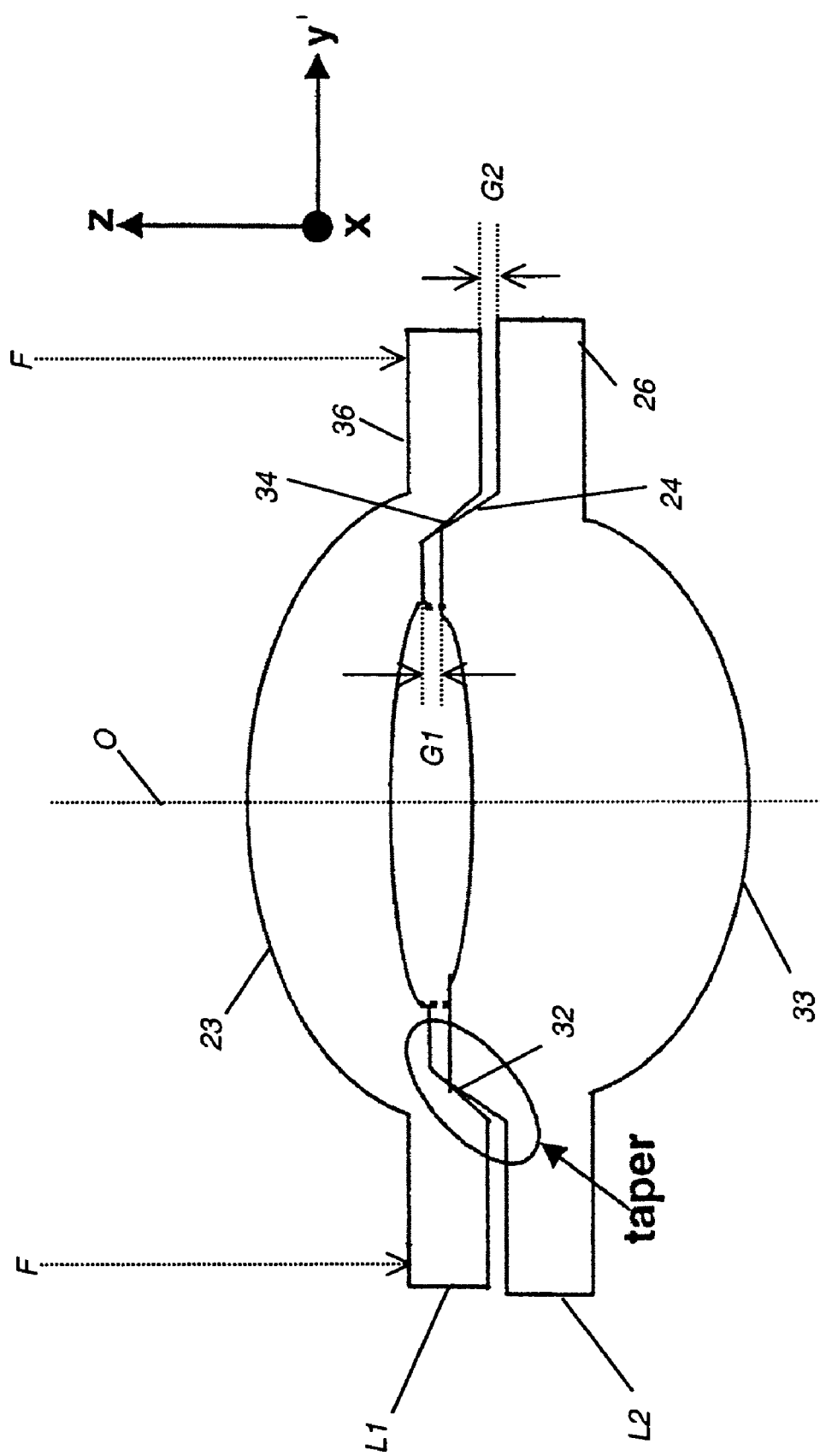
FIG. 6 is a schematic side view showing the tapered fit in an assembly process according to one embodiment.

Of particular interest is the arrangement and use of outer portions 26 and 36 for lens elements L2 and L1. Referring to FIG. 6, there is shown, in cross-sectional form, how lens elements L2 and L1 form the tapered fit and the relationship of outer portions 26 and 36. In the embodiment shown in FIG. 6, tapered surfaces 24 and 34 come in contact over a contact area 32. Contact area 32 may extend over all or most of tapered surfaces 24 or 34. At a minimum, as shown in the cross sectional view of FIG. 6, contact area 32 extends over only a small segment of tapered surfaces 24 and 34, defining a circle when lens elements L1 and L2 are axisymmetric, as in the embodiment of Figures shown in this specification.

Still referring to FIG. 6, there is a first gap G1 on the clear aperture 23/33 side of contact area 32 and a second gap G2 on the opposite side of contact area 32, between outer portions 26 and 36. By providing this clearance of gaps G1 and G2 on opposite sides of contact area 32, the alignment method used here avoids potential overconstraint problems that were characteristic of earlier alignment solutions described in the background section above.

For achieving optical alignment of lens elements L1 and L2 and maintaining lens elements L1 and L2 in contact with this tapered fit, within lens barrel 22 as was described with reference to FIG. 2, a force F is applied in the direction of optical axis O (along the z axis direction using the coordinate arrangement shown in FIG. 6). Where lens element L1 is formed from a compliant material such as plastic, applied force F can even be sufficient to bend outer portion 36 inward, compressing lens element L1 against lens element L2 at contact area 32. With sufficient force F, it may even be possible to compress an outer edge or other part of outer portion 36 into contact against a corresponding part of outer portion 26. However, to avoid overconstraint, some gap G2 must be maintained between outer portions 36 and 26. That is, both gaps G1 and G2 must exist in order to avoid overconstraint.

It is important to limit any amount of tilt between lenses L1 and L2, since excessive tilt between lens elements L1 and L2 can cause significant degradation in the resulting image. Tilt can occur if lens element L2 becomes tilted with respect to lens element L1 during some part of the assembly process. This can happen when lens elements L1 and L2 are brought together at an excessive contact angle, so that their respective tapered surfaces 34 and 24 do not align as intended. Tapered surface 24 of lens element L2 and tapered surface 34 of lens element L1 can then become locked. Even after application of force F as shown in FIG. 6, lens element L2 may remain tilted relative to lens element L1.

Figure 7B:
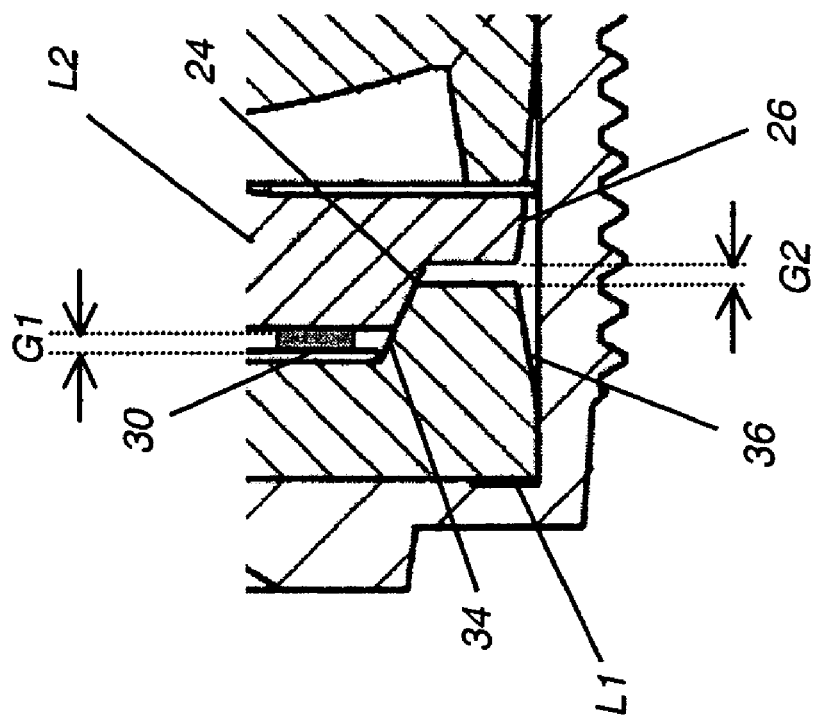
FIG. 7B is an enlarged side view showing a spacing element used in a lens assembly according to an alternate embodiment.
Figure 7A:
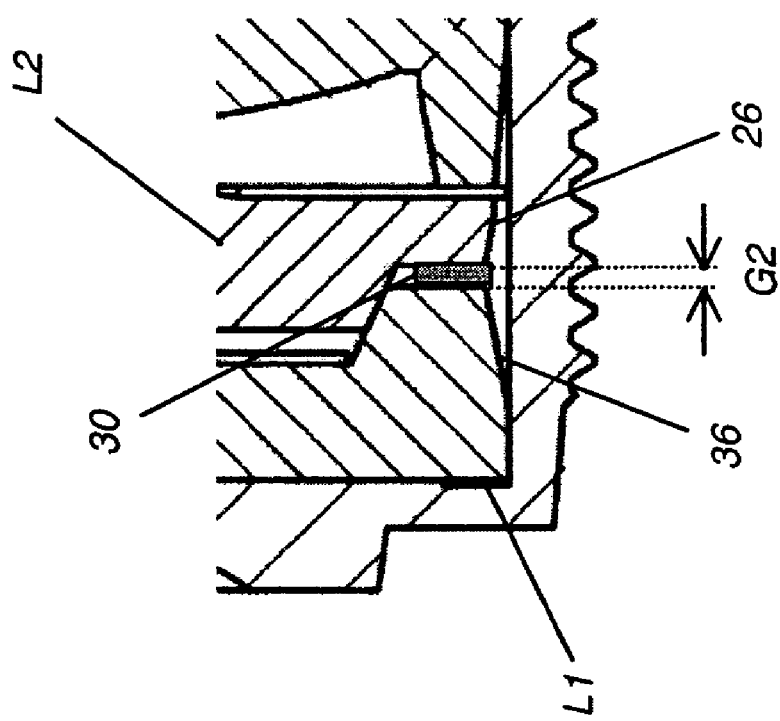
FIG. 7A is an enlarged side view showing a spacing element used in a lens assembly according to one embodiment.

As one strategy for preventing tilt misalignment at the interface of tapered surfaces 24/34, supplementary spacing components can be used. Referring to the close-up view of FIG. 7A, a compliant spacing member 30 is inserted into gap G2 between outer portions 36 and 26 of lens elements L1 and L2. Alternately, as shown in FIG. 7B, compliant spacing member could be inserted into gap G1, in the space between tapered surfaces 24, 34 and the clear aperture. This may be preferable, for example, where lens width is very small.

In one embodiment, the initial, uncompressed thickness of compliant spacer member 30 is greater than that of gap G2 (FIG. 7A) or G1 (FIG. 7B). Because of this, tapered surfaces 24 and 34 are "pre-aligned" so that gross tilt misalignment is corrected before tapered surfaces 24 and 34 are mated together. Thus, unintended locking of tapered surfaces 24 and 34 can be prevented and correct alignment achieved. In applying force F, as described with reference to FIG. 6, compliant spacing member 30 can then be compressed to some degree to suit the desired gap G2 dimensions. Again, some amount of mechanical compliance would be required in order to prevent an overconstraint condition. In order to maintain compression of compliant spacing member 30, retaining ring 13 and adhesive 14, or an equivalent binding mechanism, would be used as described with respect to FIG. 2.

The inner diameter of compliant spacing member 30 preferably follows the overall shape of the periphery or circumference of tapered surfaces 24 and 34. Compliant spacing member 30 may be fabricated from any of a number of suitable materials, including rubber and plastics. Compliant spacing member 30 need not be transparent, since it lies outside of the clear aperture 33, 23 of lens elements L1 and L2. In fabrication, compliant spacing member 30 may be temporarily or permanently bonded to either of lens elements L1 and L2.

The taper angle used, shown in FIG. 3 as angle A, may be any angle suited to the characteristics of the optical apparatus and of the assembly process. Typically, the taper angle is inclined between 5 and 70 degrees, but preferably between about 15 and 45 degrees from the optical axis. The taper angle can be provided on the molded part itself or can be machined into lens element L1 or L2, using machining techniques such as those conventionally used to form a bezel. While the taper angles A for tapered surface 24 and its mating tapered surface 34 may be substantially equal, there may be advantages in using different angles, as was shown in the cross section of FIG. 6.

For best results in aligning lenses L1 and L2 with minimum tilt with respect to x and y axes, it has proven advantageous to bring lens elements L1 and L2 into contact by applying a uniform force, symmetrically distributed with respect to optical axis O. This force must be sufficient to overcome the friction between lens elements L1 and L2 over contact area 32 (FIG. 6). In practice, forces on the order of 2–5 pounds have proved workable for aligning lens elements L1, L2.

Using the tapered fit solutions described herein, the present invention provides an optical system that can be very small in size and assembled from inexpensively fabricated components, such as plastic lenses. Because the method of the present invention avoids the use of a combination of potentially conflicting abutment and tapered fittings, this method provides a design that is inherently more forgiving with relation to tolerance errors than are earlier lens assembly solutions. The method of the present invention is well suited for use with small-scale optical assemblies. In an exemplary embodiment, for example, an optical system such as is shown in FIG. 2 can be assembled to provide suitable centration and lens spacing for at least two lens elements. Tilt orthogonal to the optical axis can be carefully controlled, allowing lens element L1, L2 alignment accurate to within a few arc-minutes. Once proper alignment is achieved, further optical component assembly procedures can be carried out to provide permanence in positioning the optical components, such as using bonding adhesives, mechanical fasteners, welds such as sonic or laser welds, or by heat application, for example.

The apparatus of the present invention allows mounting a lens element without being overconstrained. As shown in the enlarged side view of FIG. 2, for example, and as described above, lens element L2, optically aligned with lens element L1 by means of the tapered fit of the present invention, does not come in contact with inner surface 19 of lens barrel 22 or other mounting structure. The present invention allows the proper orientation of a lens element, so that a lens element having a specially treated surface is not inadvertently reversed in assembly, for example.

Figure 8:
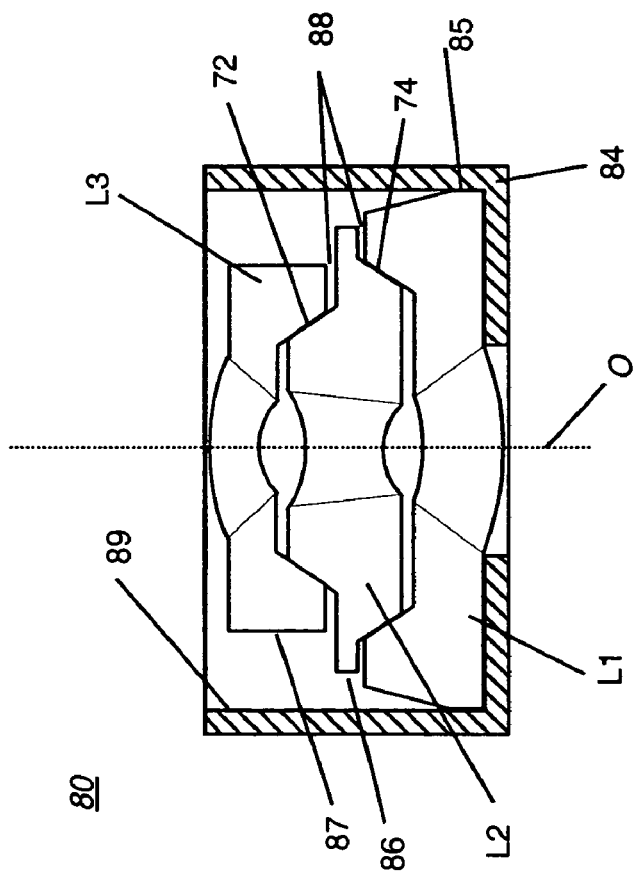
FIG. 8 is a cross-sectional side view showing a lens assembly having multiple lens elements that are optically aligned using tapered surfaces.
Figure 10:
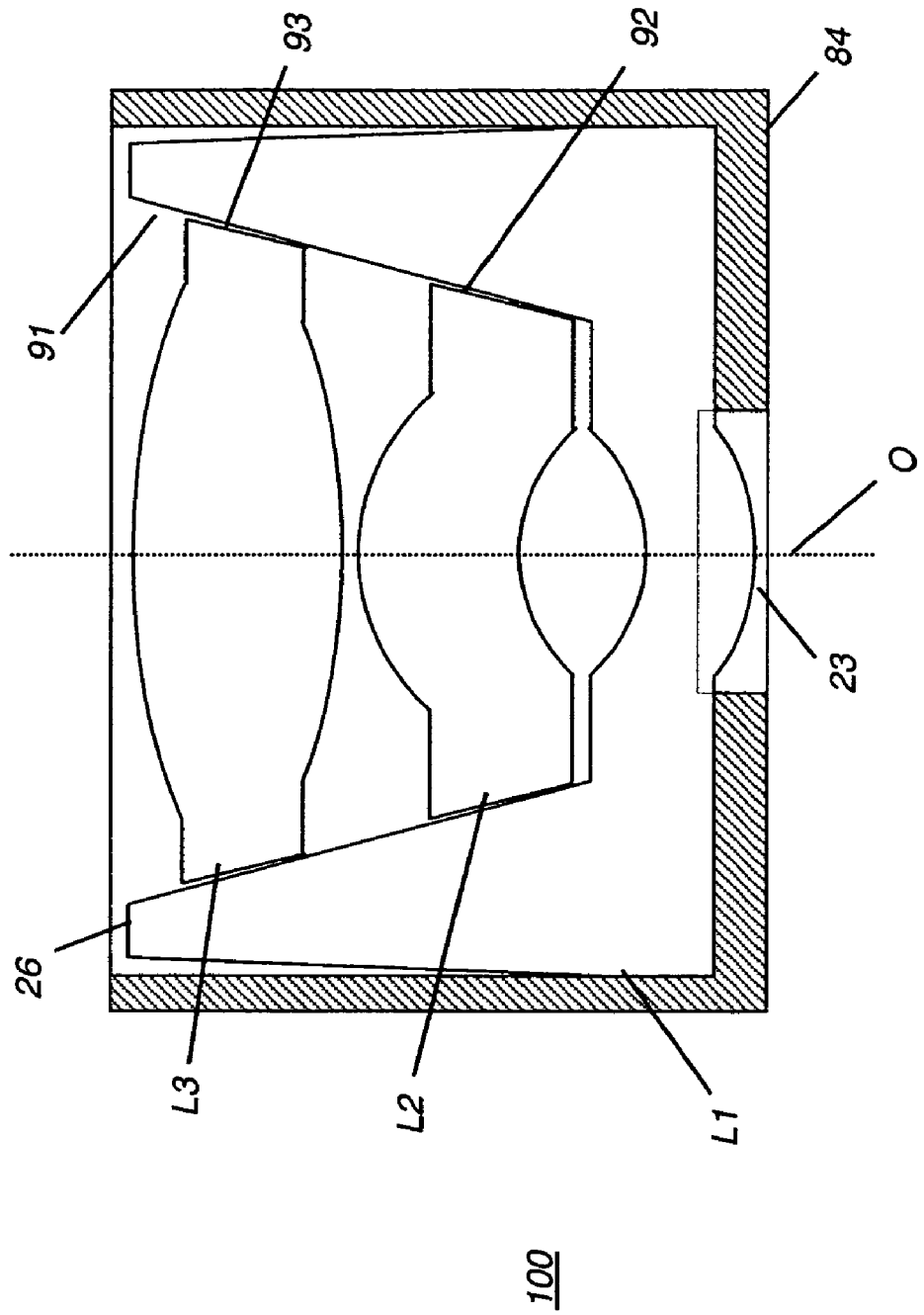

While the embodiments of FIGS. 2–6 show optical assemblies in which two lens elements L1 and L2 are aligned using a tapered fit, the basic principles outlined above can be extended to use tapered fits for more than two lenses. FIG. 8 shows a lens assembly 80 in which three lens elements L1, L2, and L3 are all optically aligned using tapered surfaces. In this case only an outside diameter 85 of lens element L1 is in contact with an inner surface 89 of a lens barrel 84. An outside diameter 86 of lens element L2 and an outside diameter 87 of lens element L3 are each floating with respect to inner surface 89. As was described above, tolerances on these lenses need not be as tightly controlled as tolerances on lenses that come into contact with the lens barrel or other mounting structure. Air gaps 88 ensure that lens elements L1, L2, and L3 are not overconstrained. Of course, taper features can be used to align four or more optical elements as well. In the example of FIG. 8, lens element L2 has a pair of convex-shaped tapered surfaces 72 and 74. Other embodiments using different arrangements of either convex-shaped or concave-shaped tapered surfaces are also possible. For example, FIG. 10 shows a lens assembly 100 in which three lens elements L1, L2, and L3 are aligned. Here, two lens elements L2 and L3 are aligned within the concave-shaped tapered surface 91 of lens element L1, thus fitting lens elements L2 and L3 within the outline of lens element L1. Tapered surface 91 of lens element L1 extends between its clear aperture 23 and outer portion 26. Lens element L2 then has tapered surface 92 that lies in contact against tapered surface 91 for alignment of lens element L2 with respect to lens element L1. Similarly, lens element L3 has a tapered surface 93 for alignment with respect to lens element L1.

Figure 9:
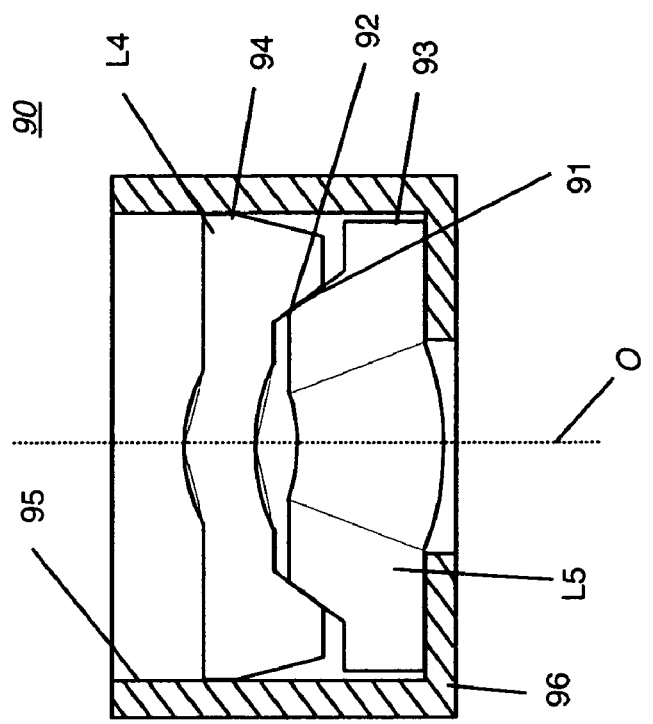
FIG. 9 is a cross-sectional side view showing a lens assembly wherein one lens element has a tapered surface that fits over the tapered surface of another lens element; and, FIG. 10 is a cross-sectional side view showing a lens assembly wherein multiple lens elements are optically aligned using tapered surface fittings.

Various arrangements are possible for alignment of one or more lenses within the lens barrel or other mounting structure, while one or more additional lenses have a tapered fit. FIG. 9 shows a lens assembly 90 in which a lens element L4 has a tapered surface 92 that fits over a tapered surface 91 of a lens element L5. In this case, an outside diameter 94 of lens element L4 comes in contact with an inner surface 95 of a lens barrel 96. An outside diameter 93 of lens element L5 floats in space, not coming into contact with inner surface 95.

It must be noted that the present invention can be used to form a compound lens structure in free-standing form, that is, not yet mounted in a lens barrel, sleeve, or other mounting structure, using suitable fixtures for assembly.

The invention has been described in detail with particular reference to certain preferred embodiments thereof, but it will be understood that variations and modifications can be effected within the spirit and scope of the invention. For example, lens elements L1 and L2 need not be axisymmetric as shown in FIGS. 3, 4, and 5. The tapered fit of the present invention could be applied for lens elements wherein clear aperture 23, 33 has refractive components that are of various shapes, such as convex, concave, plano, or meniscus in profile, including clear apertures that are non-circular, such as those of cylindrical or toroidal lenses, for example. With non-circular lenses, tapered surfaces would themselves also be non-circular. While tapered surfaces are shown extending around the full circumference of clear apertures 23, 33 in the embodiments described above, the tapered surface could extend only partially around clear aperture 23, 33. One or both lens elements may be formed from a suitable optical material, such as glass, plastic, or some composite material.

Thus it can be seen that the present invention provides an optical apparatus and method using tapered surfaces to effect alignment of lens elements.

| PARTS LIST | |
|---|---|
| 10. | Lens mount assembly |
| 12. | Spacer |
| 13. | Retaining ring |
| 14. | Adhesive |
| 16. | Barrel |
| 17, 18, 21. | Outer diameter |
| 19. | Inner surface |
| 20. | Optical system |
| 22. | Lens barrel |
| 23. | Clear aperture |
| 24. | Tapered surface |
| 26. | Outer portion |
| 30. | Spacing member |
| 32. | Contact area |
| 33. | Clear aperture |
| 34. | Tapered surface |
| 36. | Outer portion |
| 72, 74. | Tapered surface |
| 80. | Lens assembly |
| 84. | Lens barrel |
| 85, 86, 87. | Outside diameter |
| 88. | Air gap |
| 89. | Inside surface |
| 90. | Lens assembly |
| 91, 92, 93. | Tapered surface |
| 94. | Outside diameter |
| 95. | Inner surface |
| 96. | Lens barrel |
| 100. | Lens assembly |
| A. | Taper angle |
| L1, L2, L3, L4, L5. | Lens element |
| G1, G2. | Gap |
| O. | Optical axis |

The invention claimed is:

1. An optical system comprising:
  a first lens element having an outer portion and a first tapered surface; and
  a second lens element having an outer portion and a second tapered surface, wherein the first lens element and the second lens element are spaced apart relative to each other and centered relative to an optical axis by a portion of the first tapered surface being in contact with a portion of the second tapered surface, the outer portion of the first lens element being spaced apart from the outer portion of the second lens element, the first lens element and the second lens element being positioned adjacent to each other as viewed along the optical axis.

2. The optical system of claim 1, the first lens element having an outer edge portion and the second lens element having an outer edge portion, wherein the outer edge portion of the first lens element is contactable with the outer edge portion of the second lens element while the outer portion of the first lens element remains spaced apart from the outer portion of the second lens element.

3. The optical system of claim 1, wherein the first tapered surface is symmetric about the optical axis.

4. The optical system of claim 1, wherein the first tapered surface has an angle of between 15 and 45 degrees relative to the optical axis.

5. The optical system of claim 1, the first lens element having a clear aperture, wherein the clear aperture of the first lens element is substantially axisymmetric.

6. The optical system of claim 1, the first lens element having a clear aperture, wherein the clear aperture of the first lens element is non-axisymmetric.

7. The optical system of claim 1 further comprising:
a compliant spacing member disposed between the outer portion of the first lens element and the outer portion of the second lens element.

8. The optical system of claim 1, wherein at least one of the first lens element and the second lens elements is plastic.

9. The optical system of claim 1 further comprising:
a lens mounting structure having an inner surface, wherein one of the first lens element and the second lens element is not in contact with the inner surface of the lens mounting structure.

10. The optical system of claim 1, the first lens element having a clear aperture and the second lens element having a clear aperture, wherein the first tapered surface is located between the clear aperture of the first lens element and the outer portion of the first lens element and the second tapered surface is located between the clear aperture of the second lens element and the outer portion of the second lens element.

11. An optical system comprising:
a first lens element having an outer portion and a first tapered surface;
a second lens element having an outer portion and a second tapered surface and a third tapered surface; and
a third lens element having a fourth tapered surface, wherein the second tapered surface of the second lens element contacts the first tapered surface of the first lens element, the third tapered surface of the second lens element contacts the fourth tapered surface of the third lens element, and the outer portion of the first lens element is spaced apart from the outer portion of the second lens element.

12. The optical system of claim 11, the outer portion of the second lens element being a first outer portion, the second lens element having a second outer portion, the third lens element having an outer portion, wherein the second outer portion of the second lens element is spaced apart from the outer portion of the third lens element.

13. The optical system of claim 11 further comprising:
a lens mounting structure having an inner surface, wherein at least one of the first lens element, the second lens element, and the third lens element is not in contact with the inner surface of the lens mounting structure.

14. A method of manufacturing an optical system comprising:
providing a first lens element having an outer portion and a first tapered surface;
providing a second lens element having an outer portion and a second tapered surface; and
positioning the first lens element and the second lens element relative to each other by contacting a portion of the first tapered surface with a portion of the second tapered surface with the outer portion of the first lens element being spaced apart from the outer portion of the second lens element, wherein positioning the first lens element and the second lens element includes positioning the first lens element and the second lens element adjacent to each other as viewed along an optical axis.

15. The method of claim 14 further comprising:
providing a mounting structure;
applying a force against the outer portion of at least one of the first and second lens elements; and
fixing the first and second lens elements relative to the mounting structure.

16. The method of claim 15, wherein fixing the first and second lens elements relative to the mounting structure comprises applying an adhesive to at least one of the first and second lens elements and the mounting structure.

17. The method of claim 15, wherein fixing the first and second lens elements relative to the mounting structure comprises applying a weld to at least one of the first and second lens elements and the mounting structure.

18. The method of claim 15, wherein fixing the first and second lens elements relative to the mounting structure comprises providing a retaining ring to within the mounting structure.

19. The method of claim 14 further comprising:
positioning a compliant spacer between the outer portion of the first lens element and the outer portion of the second lens element.

20. The optical system of claim 1 further comprising:
a compliant spacing member disposed between the first lens element and the second lens element.

21. An optical system comprising:
a first lens element having a first tapered surface;
a second lens element having a second tapered surface; and
a third lens element having a third tapered surface, the third lens element being spaced apart from the second lens element, wherein the second tapered surface of the second lens element contacts the first tapered surface of the first lens element, and the third tapered surface of the third lens element contacts the first tapered surface of the first lens element.

22. The optical system of claim 1, wherein the first tapered surface has an angle of between 5 and 70 degrees relative to the optical axis.

23. An optical system comprising:
a first lens element having an outer portion, an outer edge portion, and a first tapered surface; and
a second lens element having an outer portion, an outer edge portion, and a second tapered surface, the first lens element and the second lens element being spaced apart relative to each other and centered relative to an optical axis by a portion of the first tapered surface being in contact with a portion of the second tapered surface, the outer portion of the first lens element being spaced apart from the outer portion of the second lens element, wherein the outer edge portion of the first lens element is contactable with the outer edge portion of the second lens element while the outer portion of the first lens element remains spaced apart from the outer portion of the second lens element.

24. An optical system comprising:
a first lens element having an outer portion and a first tapered surface;
a second lens element having an outer portion and a second tapered surface; and
a compliant spacing member disposed between the outer portion of the first lens element and the outer portion of the second lens element, wherein the first lens element and the second lens element are spaced apart relative to each other and centered relative to an optical axis by a portion of the first tapered surface being in contact with a portion of the second tapered surface, the outer portion of the first lens element being spaced apart from the outer portion of the second lens element.

25. The optical system of claim 24 further comprising:
a lens mounting structure having an inner surface, wherein one of the first lens element and the second lens element is not in contact with the inner surface of the lens mounting structure.

26. The optical system of claim 24, wherein the first tapered surface has an angle of between 5 and 70 degrees relative to the optical axis.

27. An optical system comprising:
a first lens element having an outer portion and a first tapered surface;
a second lens element having an outer portion and a second tapered surface; and
a lens mounting structure having an inner surface, wherein one of the first lens element and the second lens element is not in contact with the inner surface of the lens mounting structure, and the first lens element and the second lens element are spaced apart relative to each other and centered relative to an optical axis by a portion of the first tapered surface being in contact with a portion of the second tapered surface, the outer portion of the first lens element being spaced apart from the outer portion of the second lens element.

28. The optical system of claim 27 further comprising:
a compliant spacing member disposed between the outer portion of the first lens element and the outer portion of the second lens element.

29. The optical system of claim 27, wherein the first tapered surface has an angle of between 5 and 70 degrees relative to the optical axis.

30. An optical system comprising:
a first lens element having an outer portion and a first tapered surface; and
a second lens element having an outer portion and a second tapered surface, wherein the first lens element and the second lens element are spaced apart relative to each other and centered relative to an optical axis by a portion of the first tapered surface being in contact with a portion of the second tapered surface, the outer portion of the first lens element being spaced apart from the outer portion of the second lens element, and the first tapered surface has an angle of between 15 and 45 degrees relative to the optical axis.

31. An optical system comprising:
a first lens element having an outer portion, a first tapered surface, and a clear aperture; and
a second lens element having an outer portion and a second tapered surface, wherein the first lens element and the second lens element are spaced apart relative to each other and centered relative to an optical axis by a portion of the first tapered surface being in contact with a portion of the second tapered surface, the outer portion of the first lens element being spaced apart from the outer portion of the second lens element, and the clear aperture of the first lens element is non-axisymmetric.

32. A method of manufacturing an optical system comprising:
providing a first lens element having an outer portion and a first tapered surface;
providing a second lens element having an outer portion and a second tapered surface;
positioning the first lens element and the second lens element relative to each other by contacting a portion of the first tapered surface with a portion of the second tapered surface with the outer portion of the first lens element being spaced apart from the outer portion of the second lens element
providing a mounting structure;
applying a force against the outer portion of at least one of the first and second lens elements; and
fixing the first and second lens elements relative to the mounting structure, wherein fixing the first and second lens elements relative to the mounting structure comprises applying at least one of a weld and an adhesive to at least one of the first and second lens elements and the mounting structure.

33. A method of manufacturing an optical system comprising:
providing a first lens element having an outer portion and a first tapered surface;
providing a second lens element having an outer portion and a second tapered surface;
positioning a compliant spacer between the outer portion of the first lens element and the outer portion of the second lens element; and
positioning the first lens element and the second lens element relative to each other by contacting a portion of the first tapered surface with a portion of the second tapered surface with the outer portion of the first lens element being spaced apart from the outer portion of the second lens element.

* * * * *